US011967904B2

United States Patent
Tanaka et al.

(10) Patent No.: US 11,967,904 B2
(45) Date of Patent: Apr. 23, 2024

(54) POLYPHASE POWER-SUPPLY DEVICE

(71) Applicant: Panasonic Intellectual Property Management Co., Ltd., Osaka (JP)

(72) Inventors: Hideki Tanaka, Osaka (JP); Takeshi Nakayashiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 180 days.

(21) Appl. No.: 17/756,657

(22) PCT Filed: Dec. 1, 2020

(86) PCT No.: PCT/JP2020/044689
§ 371 (c)(1),
(2) Date: May 30, 2022

(87) PCT Pub. No.: WO2021/117551
PCT Pub. Date: Jun. 17, 2021

(65) Prior Publication Data
US 2022/0416665 A1  Dec. 29, 2022

(30) Foreign Application Priority Data

Dec. 13, 2019  (JP) ................................. 2019-224966

(51) Int. Cl.
*H02M 3/158* (2006.01)
(52) U.S. Cl.
CPC ................................ *H02M 3/1586* (2021.05)
(58) Field of Classification Search
CPC .. H02M 3/158; H02M 3/1586; H02M 1/0043; H02M 1/44

(Continued)

(56) References Cited

U.S. PATENT DOCUMENTS

| | | | | |
|---|---|---|---|---|
| 2007/0228837 | A1* | 10/2007 | Nielsen ................. | H02M 7/155 307/82 |
| 2008/0094049 | A1* | 4/2008 | Wu ..................... | H02M 3/1584 323/288 |
| 2013/0214751 | A1* | 8/2013 | Shiraishi ............. | H02M 3/1584 323/272 |

FOREIGN PATENT DOCUMENTS

JP  2010-252513  11/2010

OTHER PUBLICATIONS

The EPC Office Action dated Dec. 12, 2022 for the related European Patent Application No. 20898711.5.

(Continued)

*Primary Examiner* — Yemane Mehari
(74) *Attorney, Agent, or Firm* — Rimon P.C.

(57) ABSTRACT

A polyphase power-supply device includes first to N-th DC-DC converters connected in parallel to each other between an input terminal and an output terminal and a switching controller configured to perform interleave control on the first to N-th DC-DC converters by supplying first to N-th pulse width modulation (PWM) signals to the first to N-th DC-DC converters, respectively, where N is any integer equal to or greater than two. A switching frequency of the first PWM signal is changed at a change time point at which a cycle of the first PWM signal starts. A length of a cycle of the k-th PWM signal firstly appearing after the change time point is shorter than lengths of subsequent cycles of the k-th PWM signal appearing the first cycle of the k-th PWM signal. This polyphase power-supply device has high reliability.

7 Claims, 3 Drawing Sheets

(58) Field of Classification Search
USPC .......................................................... 323/271
See application file for complete search history.

(56) References Cited

OTHER PUBLICATIONS

Mon J. et al., "Hybrid modulator for power converters in parallel topology," Power Electronics and Motion Control Conference (EPE/PEMC), 2012 15TH International, IEEE, Sep. 4, 2012, pp. DS2c.I-I, XP032311890.

Mon J. et al., "Contribution to conducted EMI reduction in multiconverter topology," IECON 2009—35th Annual Conference of IEEE Industrial Electronics (IECON 2009)—Nov. 3-5, 2009—Porto, Portugal, IEEE, Piscataway, NJ, USA, Nov. 3, 2009 (Nov. 3, 2009), pp. 4086-4091, XP031629747.

Mon J. et al., "A new switching frequency modulation scheme for EMI reduction in multiconverter topology," 13th European Conference On Power Electronics and Applications, 2009 EPE '09; Sep. 8-10, 2009, Barcelona, Spain, IEEE, Piscataway, NJ, USA, Sep. 8, 2009, pp. 1-8, XP031541241.

International Search Report of PCT application No. PCT/JP2020/044689 dated Jan. 19, 2021.

\* cited by examiner

POLYPHASE POWER-SUPPLY DEVICE

TECHNICAL FIELD

The present disclosure relates to a polyphase power-supply device employed in various electronic apparatuses.

BACKGROUND ART

In a conventional polyphase power-supply device, a pulse signal for turning on and off a switching element of the power-supply device is used for controlling output. A duration for which the pulse signal continues (on-duty duration) and a duration for which the pulse signal does not exist (off-duty duration) are provided in one cycle of a predetermined switching frequency to perform pulse width modulation (PWM) control. The ratio (duty ratio) of the on-duty duration and the off-duty duration in the PWM control is continuously adjusted according to a voltage or current output from the power-supply device so as to control an output electric power of the power-supply device to allow the power to be a target value.

The switching element is repetitively turned on and off and causes the power-supply device to emit noise. As a measure to suppress influence of noises on surrounding electronic apparatuses, a spread spectrum control is performed to fluctuate the switching frequency of the PWM signal within a predetermined range. This control suppresses concentration of noise radiation on a particular frequency. This configuration suppresses the influence of noise radiation on surrounding apparatuses.

A conventional polyphase power-supply device is disclosed in, e.g. PTL 1.

CITATION LIST

Patent Literature

PTL1: Japanese Patent Laid-Open Publication No. 2010-252513

SUMMARY

A polyphase power-supply device includes first to N-th DC-DC converters connected in parallel to each other between an input terminal and an output terminal and a switching controller configured to perform interleave control on the first to N-th DC-DC converters by supplying first to N-th pulse width modulation (PWM) signals to the first to N-th DC-DC converters, respectively, where N is any integer equal to or greater than two. A switching frequency of the first PWM signal is changed at a change time point at which a cycle of the first PWM signal starts. A length of a cycle of the k-th PWM signal firstly appearing after the change time point is shorter than lengths of subsequent cycles of the k-th PWM signal appearing the first cycle of the k-th PWM signal.

This polyphase power-supply device has high reliability.

DESCRIPTION OF EMBODIMENT

Figure 1:
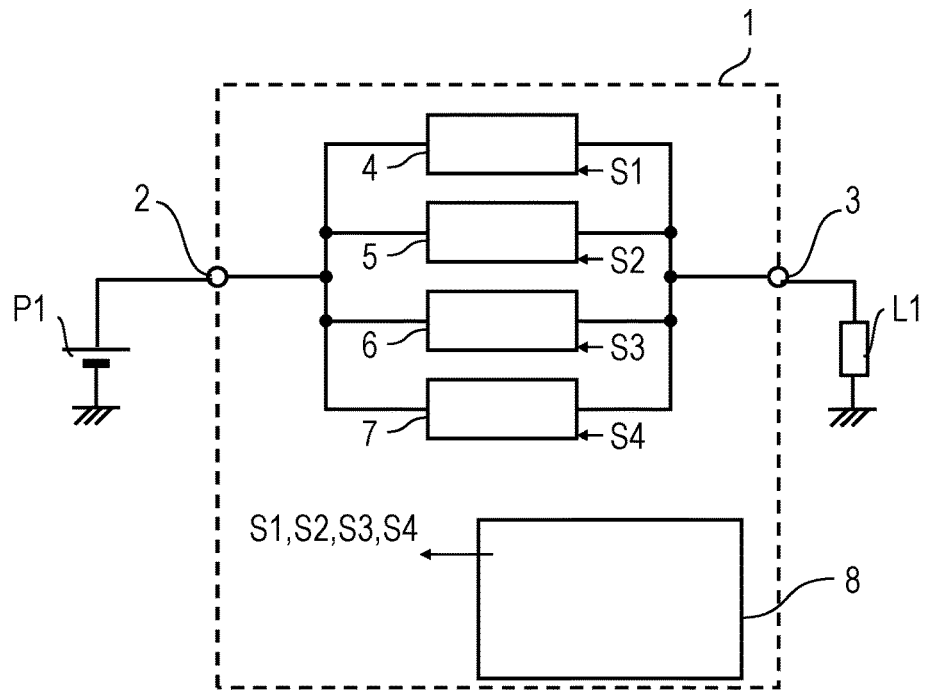
FIG. 1 is a circuit block diagram of a polyphase power-supply device in accordance with an exemplary embodiment.

FIG. 1 is a circuit block diagram of polyphase power-supply device 1 in accordance with an exemplary embodiment. Polyphase power-supply device 1 includes input terminal 2, output terminal 3, DC-DC converter 4 of a first phase, second-phase DC-DC converter 5, third-phase DC-DC converter 6, fourth-phase DC-DC converter 7, and switching controller 8. In accordance with the embodiment, the number of phases is four, and the four DC-DC converters are provided in polyphase power-supply device 1. The number of phases N is an integer equal to or greater than 2. DC-DC converters 4 to 7 are connected in parallel to one another between input terminal 2 and output terminal 3. Input end 42 of DC-DC converter 4, input end 52 of DC-DC converter 5, input end 62 of DC-DC converter 6, and input end 72 of DC-DC converter 7 are connected to input terminal 2. Output end 43 of DC-DC converter 4, output end 53 of DC-DC converter 5, output end 63 of DC-DC converter 6, and output end 73 of DC-DC converter 7 are connected to output terminal 3. Input terminal 2 is configured to be connected to DC power supply P1. Output terminal 3 is configured to be connected to load L1.

Switching controller 8 supplies pulse width modulation (PWM) signal S1 configured to control an operation of first-phase DC-DC converter 4, PWM signal S2 configured to control and operation of second-phase DC-DC converter 5, PWM signal S3 configured to control and operation of third-phase DC-DC converter 6, and PWM signal S4 configured to control an operation of fourth-phase DC-DC converter 7. PWM signal S2 is delayed from PWM signal S1 by a phase of 90°. PWM signal S3 is delayed from PWM signal S2 by a phase of 90°. PWM signal S4 is delayed from PWM signal S3 by a phase of 90°. In other words, the number of phases N is four in accordance with the embodiment, PWM signal S1, PWM signal S2, PWM signal S3, and PWM signal S4 have a phase difference of 90° ($\pi/2$) obtained by dividing 360° ($2\pi$) by the number of phases N. First-phase DC-DC converter 4, second-phase DC-DC converter 5, third-phase DC-DC converter 6, and fourth-phase DC-DC converter 7 are controlled to perform an interleave operation.

In the case that a switching frequency of PWM signals S1 to S4 is changed from first frequency f1 to second frequency f2, switching controller 8 provides period difference Tp calculated by subtracting period T2 of second frequency f2 from period T1 of first frequency f1, and provides differential time D obtained by dividing period difference Tp by the number of phases N as D=Tp/N. Regarding respective first cycles of PWM signals S2 to S4 supplied to DC-DC converters 5 to 7 firstly appearing after changing the switching frequency, respectively, switching controller 8 utilizes differential time D to change and shorten a length of a first cycle of PWM signal S2 from period T2 by time D, change and shorten a length of the first cycle of PWM signal S3 from period T2 by time 2·D, and change and shorten a length of the first cycle of PWM signal S4 from period T2 by time 3·D. Based on the number of phases N, the lengths of the first cycles of PWM signals S2 to S4 are sequentially changed and shortened from period T2 by time D for the second phase to by a product of time D and (N-1) for the N-th phase. In other words, the lengths of the respective first cycles of PWM signals S1, S2, S3, and S4 firstly appearing after the switching frequency is changed are different from one another.

Then, in the second and subsequent cycles of PWM signals S1 to S4 after the switching frequency is changed, pulse-width control circuit 13 sequentially supplies PWM signals S1 to S4 having a rising timing of an on-duty duration shifted by a phase difference of 90°. Here, PWM signals S1 to S4 have same length, period T2 at second frequency f2 and are supplied to control the operations of the first-phase DC-DC converter 4, second-phase DC-DC converter 5, third-phase DC-DC converter 6, and fourth-phase DC-DC converter 7. In other words with the number of phases N, the PWM signals of the first to N-th phases sequentially have a phase difference obtained by dividing 360° by the number of phases N. The PWM signals of the first to N-th phases have second frequency f2 with the same length and are supplied to control the operations of the first phase to N-th phase DC-DC converters.

In the above configuration and operation, when spread spectrum control is performed, imbalances in output electric power between DC-DC converters 4, 5, 6, and 7 due to the switching frequency switched from first frequency f1 to second frequency f2 occur only for a short time after the frequency is switched. Continuation or accumulation of imbalances in output electric power is therefore prevented, thus improving operation reliability of polyphase power-supply device 1.

Figure 2:
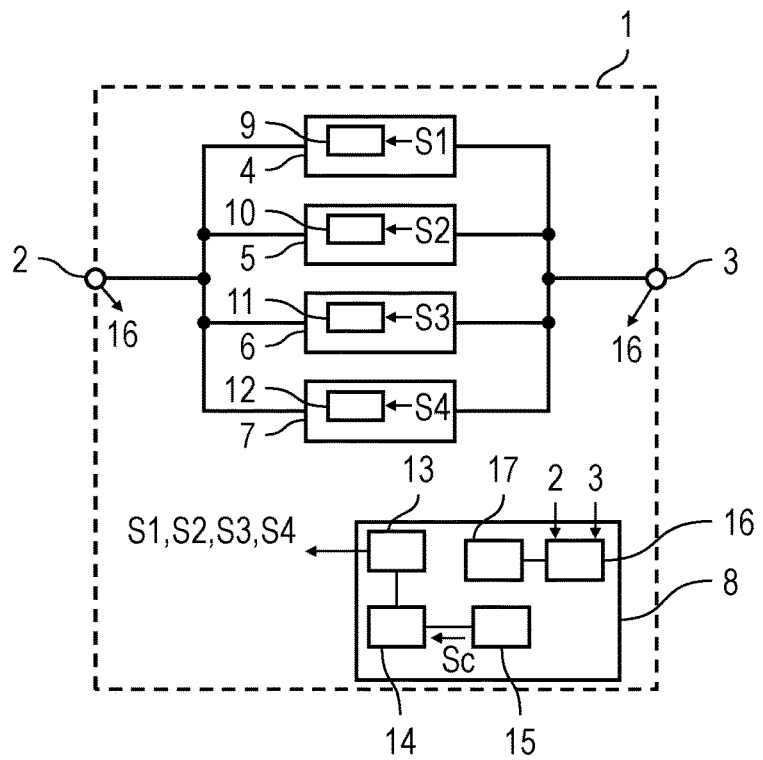
FIG. 2 is a circuit block diagram of the polyphase power-supply device in accordance with the embodiment.
Figure 3:
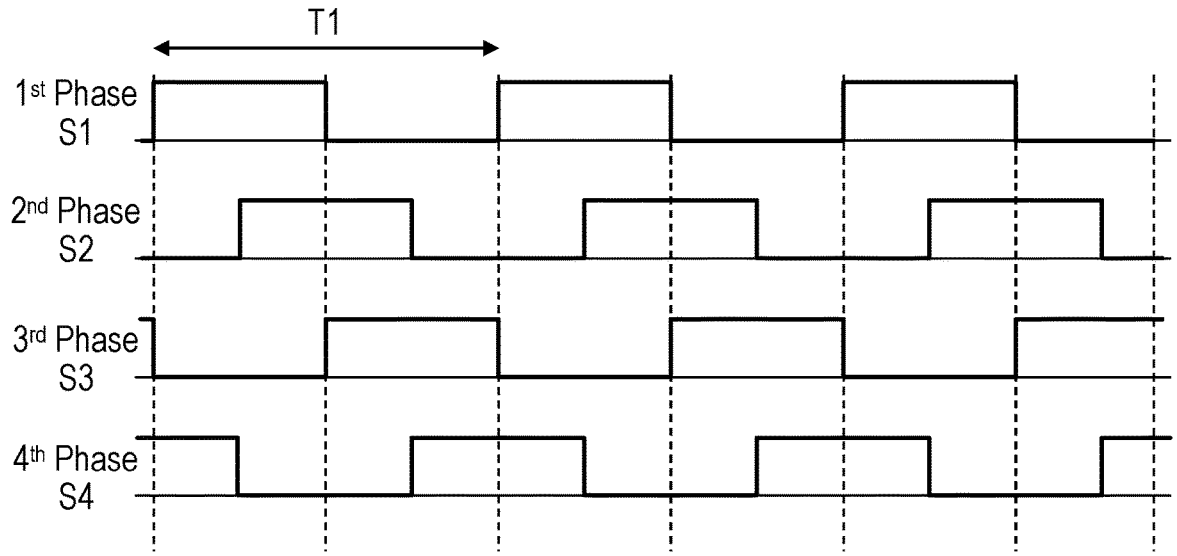
FIG. 3 is a timing chart of the polyphase power-supply device in a normal operation state in accordance with the embodiment.

Next, an operation of polyphase power-supply device 1 in accordance with the exemplary embodiment will be detailed below. FIG. 2 is a circuit block diagram of polyphase power-supply device 1. FIG. 3 is a timing chart of polyphase power-supply device 1 in a normal operation state.

Polyphase power-supply device 1 includes input terminal 2, output terminal 3, DC-DC converter 4 of a first phase, DC-DC converter 5 of a second phase, DC-DC converter 6 of a third phase, DC-DC converter 7 of a fourth phase, and switching controller 8. In accordance with the embodiment, the number of phases N is four, and polyphase power-supply device 1 including the first-phase to fourth-phase DC-DC converters will be described. The number of phases N may be any integer equal to or greater than two. All DC-DC converters 4 to 7 connected in parallel to one another may be step-down converters. Alternatively, all DC-DC converters 4 to 7 may be boosting-up converters.

First-phase DC-DC converter 4, second-phase DC-DC converter 5, third-phase DC-DC converter 6, and fourth-phase DC-DC converter 7 are connected to input terminal 2 and output terminal 3 in parallel to one another between input terminal 2 and output terminal 3. First-phase DC-DC converter 4 includes switching element 9. Second-phase DC-DC converter 5 includes second switching element 10. Third-phase DC-DC converter 6 includes third switching element 11. Fourth-phase DC-DC converter 7 includes fourth switching element 12.

Each of first switching element 9, second switching element 10, third switching element 11, and fourth switching element 12 may be semiconductor devices having substantially the same characteristic. The semiconductor device may be, for example, a field effect transistor (FET) or an insulated gate bipolar transistor (IGBT).

Switching controller 8 includes pulse-width control circuit 13, frequency control circuit 14, spread spectrum circuit 15, detection circuit 16, and calculation circuit 17. Pulse-width control circuit supplies PWM signal S1 configured to control the turning on and off of the first switching element 9, PWM signal S2 configured to control the turning on and off of second switching element 10, PWM signal S3 configured to control the turning on and off of third switching element 11, and PWM signal S4 configured to control the turning on and off of fourth switching element 12. Frequency control circuit 14 controls frequencies of PWM signals S1 to S4. Spread spectrum circuit 15 controls PWM signals S1 to S4 to fluctuate their frequencies.

Frequency fluctuation control by spread spectrum circuit 15 is not particularly limited as long as a switching frequency can be changed to reduce noise radiation. The fluctuation control is, for example, linear control in which frequencies roughly change linearly in a predetermined cycle, sine-wave control in which frequencies roughly change in a sinusoidal pattern in a predetermined cycle, or random control in which frequencies change at random by using a random number for fluctuation width or fluctuation cycle in a predetermined range.

A duration until the switching frequency changes stepwise from a certain value to a next value, i.e., for example, a duration that first frequency f1 continues until the switching frequency changes from first frequency f1 to second frequency f2 and a subsequent duration that second frequency f2 continues are equal to or longer than a period of PWM signals S1 to S4. The duration for which first frequency f1 or second frequency f2 continues includes plural cycles of PWM signals S1 to S4.

Pulse-width control circuit 13 supplies PWM signal S1, PWM signal S2, PWM signal S3, and PWM signal S4. PWM signal S2 is delayed from PWM signal S1 by a phase of 90°. PWM signal S3 is delayed from PWM signal S2 by a phase of 90°. PWM signal S4 is delayed from PWM signal S3 by a phase of 90°. In other words, since the number of phases N is four in accordance with the exemplary embodiment, PWM signal S1, PWM signal S2, PWM signal S3, and PWM signal S4 have a phase difference of 90° (π/2) which is obtained by dividing 360° (2π) by the number of phases N from one another. First-phase DC-DC converter 4, second-phase DC-DC converter 5, third-phase DC-DC converter 6, and fourth-phase DC-DC converter 7 are controlled to perform an interleave operation.

FIG. 3 is a timing chart of a normal operation in which polyphase power-supply device 1 shown in FIG. 2 is performing the normal operation. The normal operation state refers to as the state that first-phase DC-DC converter 4, second-phase DC-DC converter 5, third-phase DC-DC converter 6, and fourth-phase DC-DC converter 7 having substantially the same characteristic and connected in parallel are controlled by PWM signals S1 to S4 at the same switching frequency which does not change with respect to time. The timing chart in the normal operation state in FIG. 3 shows an example when a duty ratio is 0.5 in PWM signals S1 to S4 for the convenience of description. However, the duty ratio of PWM signals S1 to S4 may change as required. The duty ratio of PWM signals S1 to S4 is determined according to the following procedure. For example, detection circuit 16 of switching controller 8 detects a voltage or current detected at input terminal 2 or output terminal 3, and information detected by detection circuit 16 is supplied to calculation circuit 17 of switching controller 8. Then, calculation circuit 17 performs an arithmetic operation, such as comparison with a target output voltage, output current or output electric power, and determines the duty ratio of each of PWM signals S1 to S4 based on information on a result of the arithmetic operation.

FIG. 3 shows PWM signals S1 to S4 at first frequency f1, which is the same switching frequency. The period of PWM signals S1 to S4 corresponding to first frequency f1 is first period T1. PWM signal S1 is illustrated as a curved line corresponding to a PWM signal that controls the operation of first switching element 9 of first-phase DC-DC converter 4. PWM signal S2 is illustrated as a curved line corresponding to a PWM signal that controls the operation of second switching element 10 of second-phase DC-DC converter 5. PWM signal S3 is illustrated as a curved line corresponding to a PWM signal that controls the operation of third switching element 11 of third-phase DC-DC converter 6. PWM signal S4 is illustrated as a curved line corresponding to a PWM signal that controls the operation of fourth switching element 12 of fourth-phase DC-DC converter 7. First-phase DC-DC converter 4, second-phase DC-DC converter 5, third-phase DC-DC converter 6, and fourth-phase DC-DC converter 7 operate with a phase difference of 90° ($\pi/2$) obtained by dividing 360° ($2\pi$) by the number of phases N. FIG. 3 shows PWM signals S1 to S4 at first frequency f1, which is the same switching frequency, and the length of each of PWM signals S1 to S4 corresponding to first frequency f1 is first period T1.

In the normal operation state, plural converters having substantially the same characteristic and connected in parallel operates at the same switching frequency and at the same duty ratio. Accordingly, first-phase DC-DC converter 4, second-phase DC-DC converter 5, third-phase DC-DC converter 6, and fourth-phase DC-DC converter 7 substantially evenly supply electric power to a load (not illustrated) connected to output terminal 3.

An operation of polyphase power-supply device 1 will be detailed with reference to a first timing chart shown in FIG. 4 that shows a switching frequency change state of the polyphase power-supply device in accordance with the exemplary embodiment of the present invention. The exemplary embodiment refers to two states that are the normal state and the frequency change state for the convenience of description. This is to clarify before and after changing the switching frequency. In the actual operation of polyphase power-supply device 1, however, the switching frequency generally changes repeatedly in a predetermined time. The frequency change state is a state that the switching frequency changes from the first frequency to the second frequency when the switching frequency in the normal state is the first frequency. Accordingly, the switching operation in which the switching frequency switches from first frequency f1 to second frequency f2 will be described below. Spread spectrum circuit 15 supplies frequency change signal Sc when a predetermined operation condition is satisfied. The condition may be, e.g. that a predetermined time elapses after starting polyphase power-supply device 1, or that an output is stabilized after starting polyphase power-supply device 1. Further, switching controller 8 may previously store the timing to supply frequency change signal Sc together with a threshold related to the above condition.

First, spread spectrum circuit 15 supplies frequency change signal Sc to frequency control circuit 14 so as to change the frequency of PWM signals S1 to S4, which is the switching frequency, from first frequency f1 to second frequency f2. For example, when frequency change signal Sc is supplied at time point t00, the frequency of PWM signal S1 for first switching element 9 in first-phase DC-DC converter 4 starts to be switched. For the convenience of description, the frequency starts to be switched from first-phase DC-DC converter 4 in the example. In general, a phase with the earliest rising timing out of PWM signals S1 to S4 after time point t00 may be determined as the first phase, or a frequency of a particular phase may be switched first. Time point t00 may be, similar to time point t11, to always coincide with the rising timing of PWM signal S1.

In response to frequency change signal Sc, the frequency of PWM signal S1 is switched from first frequency f1 to second frequency f2 at time point t11. In other words, in first-phase DC-DC converter 4, period T1 of PWM signal S1 corresponding to first frequency f1 is switched to period T2 corresponding to second frequency f2.

Then, in response to transmission of frequency change signal Sc, calculation circuit 17 provides differential time D obtained by dividing period difference Tp by the number of phases N. Period difference Tp is equivalent to a period change amount when the switching frequency changes from first frequency f1 to second frequency f2. Here, period difference Tp is T1−T2, and differential time D is Tp/N.

Then, pulse-width control circuit 13 sequentially change, differential time D, the first cycle of PWM signals S2 to S4 for second-phase DC-DC converter 5 to fourth-phase DC-DC converter 7 appearing immediately after frequency change signal Sc is supplied. This operation will be described step by step with reference to FIG. 4. In first-phase DC-DC converter 4, the period of PWM signal S1 switches from T1 to T2 at time point T11 at which the switching frequency is switched from first frequency f1 to second frequency f2, as described above. Next, when the switching frequency of second-phase DC-DC converter 5 is switched from first frequency f1 to second frequency f2 delayed from first-phase DC-DC converter 4 by a phase of 90°, the period of PWM signal S2 is switched from T1 to T2—D at time point t12 at rising from off to on. Then, when the switching frequency for third-phase DC-DC converter 6 is switched from first frequency f1 to second frequency f2 delayed from second-phase DC-DC converter 5 by a phase of 90°, the period of PWM signal S3 switches from T1 to T2—2·D at time point t13 at rising from off to on. Further, when the switching frequency for fourth-phase DC-DC converter 7 is switched from first frequency f1 to second frequency f2 from third-phase DC-DC converter 6 delayed by a phase of 90°, the period of PWM signal S4 switches from T1 to T2—3·D at time point t14 at rising from off to on. When the number of phases N is used in the description, durations of the first cycles of PWM signals S2 to SN are sequentially changed by the differential time D for the second phase to the product of D and (N-1) for the N-th phase.

Then, pulse-width control circuit 13 sequentially supplies PWM signals S1 to S4 having a phase difference of 90° at rising of on-duty at time points Ta, Tb, Tc, and Td in the second cycle of PWM signals S1 to S4 after frequency change signal Sc is supplied from frequency control circuit 14. PWM signals S1 to S4 have period T2 equivalent to the switching frequency of second frequency f2. In other words, the second and subsequent cycle of PWM signals S1 to S4 after frequency change signal Sc is supplied, the state of 90-degree phase difference continues from time point Ta, Tb, Tc, and Td until frequency change signal Sc is further supplied.

Figure 4:
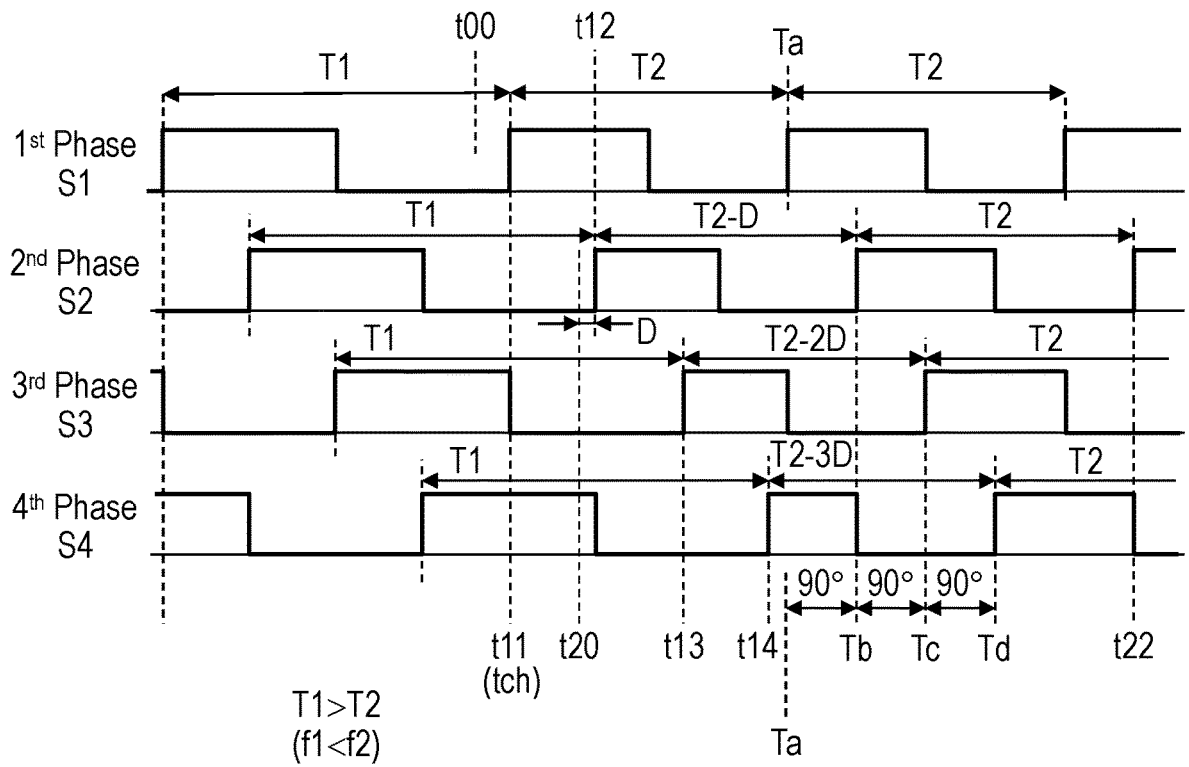
FIG. 4 is a timing chart of the polyphase power-supply device in a frequency change state in accordance with the embodiment.

In the example of timing chart in FIG. 4, lengths of respective first cycles of PWM signals S2 to S4 firstly appearing after frequency change signal Sc is supplied are changed to T2—D, T2—3·D, respectively. Then, respective second cycles of PWM signals S2 to S4 have lengths of T2. However, in second-phase DC-DC converter 5 as an example, the first cycle and the second cycle of PWM signal S2 has lengths changed from T2—D to T2 from time point t12 to time point t22. Although not illustrated, the lengths of cycles may change stepwise over multiple cycles from the first cycle to the third or fourth cycle to change from T2—D to T2. The description is omitted here but PWM signal S3 and PWM signal S4 may also change their lengths stepwise over multiple cycles similarly.

When the above is described using the number of phases N, from the second cycle after the switching frequency is switched from first frequency f1 to second frequency f2, PWM signals S1 to SN of the first to N-th phases sequentially have a phase difference of a value obtained by dividing 360° by the number of phases N at rising of on-duty. Pulse-width control circuit 13 supplies PWM signals S1 to SN at second frequency f2 with same period T2 to control the first phase to N-th phase DC-DC converters.

In the exemplary embodiment, second frequency f2 of the switching frequency has a larger value than first frequency f1 in FIG. 4. Accordingly, period T1 has a larger value than period T2. Further, period difference Tp is defined as the period displacement amount when the switching frequency changes from first frequency f1 to second frequency f2, i.e., T1—T2. Differential time D is defined as Tp/N. For example, the length of the first cycle of second-phase DC-DC converter 5 is shortened to T2—D. Accordingly, as shown in the example in FIG. 4, T1—T2 is a positive value, and Tp/N is a positive value. Similarly, in a sequential manner, the length of the first cycle of third-phase DC-DC converter 6 is shortened to T2—2·D, and the length of the first cycle of fourth-phase DC-DC converter 7 is shortened to T2—3·D.

In other words, in the case first frequency f1 is lower than second frequency f2, the periods of the signal to second-phase DC-DC converter 5 to the signal to fourth-phase DC-DC converter 7 are temporarily shortened at the changing of the switching frequency. On the other hand, when first frequency f1 is higher than second frequency f2, a value of T1-T2 and D are negative values. The value of T2–D becomes larger than T2 in second-phase DC-DC converter 5, and the period is temporarily extended when the switching frequency is changed. It is apparent that the same applies to third-phase DC-DC converter 6 and fourth-phase DC-DC converter 7, and the period of the signals increases sequentially.

As described above, the period is temporarily shortened when the switching frequency changes from a low value to high value. As a procedure for shortening the period, for example, in the second-phase DC-DC converter 5, the rising timing of an on-time duration is delayed to time point t12 by an absolute value of differential time D from time point t20 at which the on-duration rises when the period is T1 without being shortened. As a result, the length of the first cycle is shortened from T2 to T2–D. Here, D is a positive value.

Figure 5:
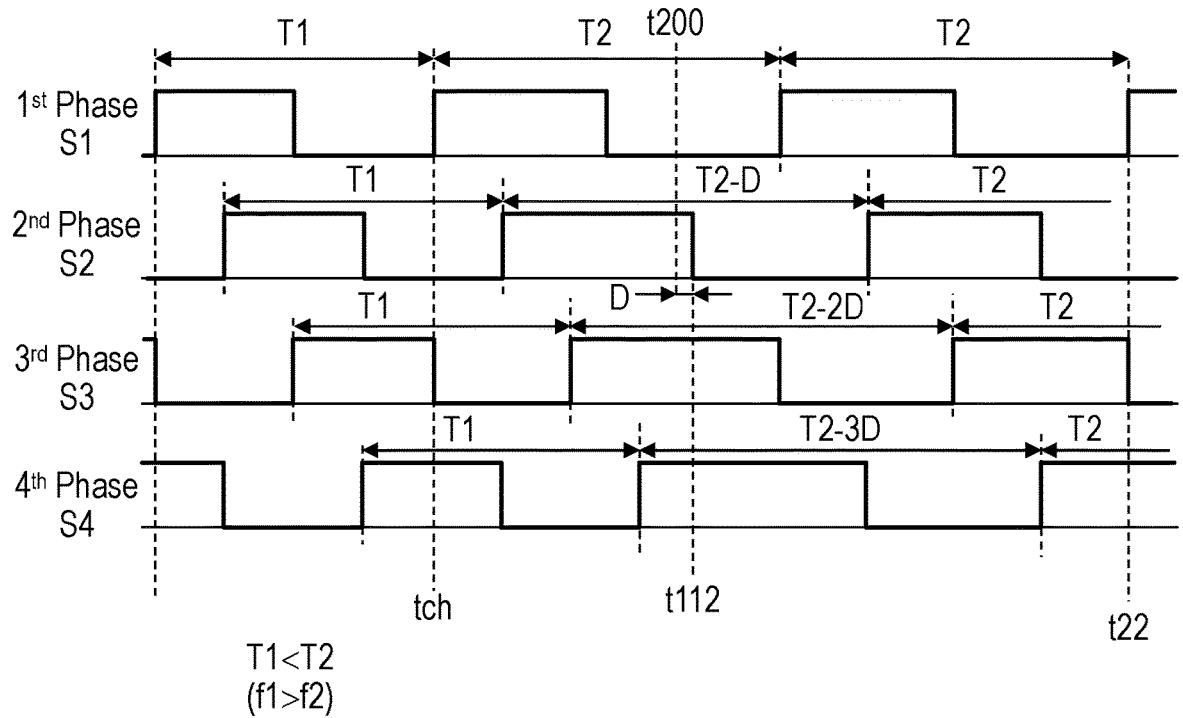
FIG. 5 is a timing chart of the polyphase power-supply device in the frequency change state in accordance with the embodiment.

On the other hand, FIG. 5 is a second timing chart of the polyphase power-supply device in accordance with the exemplary embodiment of the present invention in the switching frequency change state. In FIG. 5, the switching frequency changes from a high value to low value and the period is temporarily extended. As a procedure for the extension, for example, in the second-phase DC-DC converter 5, the falling timing of an on-time at which an on-duty duration is switched to an off-duty duration is delayed to time point t112 by an absolute value of differential time D from time point t200 at which the on-duration falls when the period is T1 without being extended. As a result, the length of the first cycle is extended from T2 to T2–D. Here, D is a negative value.

In the above control in the exemplary embodiment, in the case that the switching frequency increases, an on-duty rising time point is delayed, the on-duty duration is shortened, and the off-duty duration is T2/2. As a result, the length of cycle after switching of the frequency is shortened. However, to shorten the cycle after switching the frequency, the on-duty rising time point may be delayed, the on-duty period may T2/2, and the off-duty duration may be shortened. As a result, the duration of cycle after switching the frequency is shortened.

In the above control in the exemplary embodiment, in the case that the switching frequency is decreased, a time point when from the on-duty is switched to off-duty is delayed, the on-duty period is extended, and the off-duty duration is T2/2. As a result, the length of cycle after the switching of the frequency is extended. However, to extend the cycles after switching the frequency, the on-duty period may be T2/2, and the off-duty period is extended. As a result, the length of cycle after the switching of the frequency is extended.

In a conventional polyphase power-supply device that does not perform shortening or extension of the lengths of cycles when the switching frequency is changed, the power supply device employing a converter is controlled in a polyphase structure. In this case, outputs of the converters do not coincide due to switchover of the switching frequency to perform the spread spectrum control. As a result, current is imbalanced in the converters. Repetitive switchover of the switching frequency leads to accumulation of imbalances in current in the converters, and may decrease the operation reliability of the power-supply device.

Figure 6:
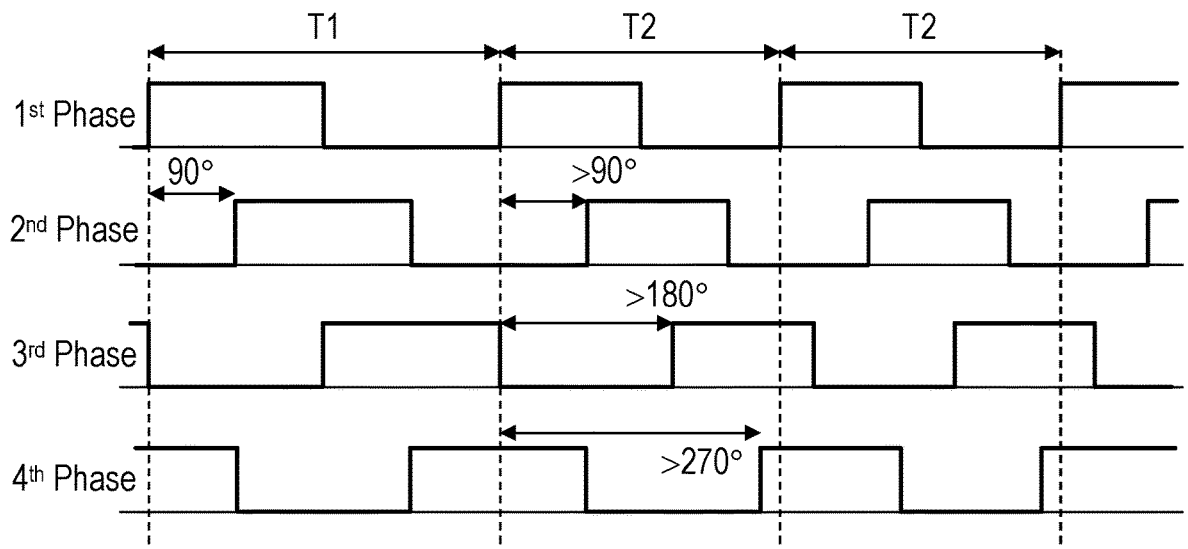
FIG. 6 is a timing chart of a comparative example of a polyphase power-supply device.

FIG. 6 is a timing chart of a polyphase power-supply device of a comparative example equivalent to the conventional polyphase power-supply device. As shown in FIG. 6, the polyphase power-supply device of the comparative example cannot retain the initial phase difference after changing the frequency. As a result, an appropriate interleave operation is not performed, and imbalances in current accumulates and increases in the converters. As a result the operation reliability of the power-supply device may decrease.

In the above exemplary embodiment, for the convenience of description, pulse-width control circuit 13, frequency control circuit 14, spread spectrum circuit 15, detection circuit 16, and calculation circuit 17 have individual functions, and are included in switching controller 8. However, switching controller 8 may have a function to integrally detect and control without separating functions to pulse-width control circuit 13, frequency control circuit 14, spread spectrum circuit 15, detection circuit 16, and calculation circuit 17. Alternatively, pulse-width control circuit 13, frequency control circuit 14, spread spectrum circuit 15, detection circuit 16, and calculation circuit 17 may not be packaged and provided in a single switching controller 8. Pulse-width control circuit 13, frequency control circuit 14, spread spectrum circuit 15, detection circuit 16, and calculation circuit 17 may be disposed separately in polyphase power-supply device 1.

To change the lengths of respective first cycle of PWM signals S2 to S4 for second-phase DC-DC converter 5 to fourth-phase DC-DC converter 7 firstly appearing after frequency change signal Sc is supplied, the lengths of the respective first cycles of PWM signals S2 to S4 are shortened or extended, as described above, by shortening or extending the on-duty duration. However, to shorten or extend the lengths of the first cycles of PWM signals S2 to S4, the off-duty duration may be shortened or extended.

A procedure for shortening the first cycle of PWM signals S2 to S4 when the switching frequency is increased will be described with reference to a part of FIG. 4. For second-phase DC-DC converter 5, the rising timing of the on-duty duration is delayed to time point t12 by an absolute value of differential time D from time point t20 at which the on-duty duration is supposed to rise when the period is T1 without being shortened. Then, the on-duty duration is set to T2/2 and the off-duty duration is shortened to T2/2—D so that the length of the first cycle is shortened from T2 to T2—D. For third-phase DC-DC converter 6, the rising timing of the on-duty duration is delayed by an absolute value of differential time 2·D from a time point at which the on-duty duration is supposed to rise when the period is T1 without being shortened. Then, the on-duty duration is set to T2/2, and the off-duty duration is shortened to T1/2 T2/2—2·D so that the length of the first cycle is shortened from T2 to T2—2·D. For fourth-phase DC-DC converter 7, the rising timing of the on-duty duration is delayed by an absolute value of differential time 3·D from a time point at which the on-duty duration is supposed to rise when the period is T1 without being shortened. Then, the on-duty duration is set to T2/2, and the off-duty duration is shortened to T2/2—3·D so that the duration of the first cycle is shortened from T2 to T2—3·D.

On the other hand, a procedure for extending the first cycle of PWM signals S2 to S4 when the switching frequency is decreased will be described with reference to a part of FIG. 5. For second-phase DC-DC converter 5, the on-duty duration of T2/2 is continued up to time point t200. Then, at time point t200, the on-duty duration is switched to the off-duty duration. Then, the off-duty duration continues from time point t200 for duration of T2/2—D. As a result, the length of the first cycle is extended from T2 to T2—D. Here, D is a negative value. Similarly, in a sequential manner, the duration is extended to T2—2·D of the first cycle for third-phase DC-DC converter 6, and the duration is extended to T2—3·D of the first cycle for fourth-phase DC-DC converter 7. Here, D is a negative value.

In other words, in order to provide different durations of PWM signals S1, S2, S3, and S4 of the respective first cycle firstly appearing after the switching frequency is changed, the same off-duty durations and different on-duty durations may be set to PWM signals S1 to S4. Alternatively, the same off-duty durations and different on-duty durations may be set to PWM signals S1 to S4, or the different off-duty durations and different off-duty durations may be set to PWM signals S1 to S4.

As described above, polyphase power-supply device 1 includes first to N-th DC-DC converters 7 to 7 connected in parallel to one another between input terminal 2 and output terminal 3, where N is an integer equal to or greater than two. Polyphase power-supply device 1 further includes switching controller 8 configured to perform interleave control on first to N-th DC-DC converters 4 to 7 by supplying first to N-th pulse width modulation (PWM) signals to first to N-th DC-DC converters 4 to 7, respectively. A phase of a k-th PWM signal out of the first to N-th PWM signals is delayed by a phase of 360°/N from a (k−1)-th PWM signal, where k is any integer satisfying 2≤k≤N. Switching controller 8 is configured to change a switching frequency of the first PWM signal from a first frequency f1 to a second frequency f2 at a change time point tch when a certain cycle of the first PWM signal starts. Switching controller 8 is configured to obtain a differential time D (=(T1−T2)/N) by dividing, by N, a period difference calculated by subtracting a period T2 of the second frequency f2 from a period T1 of the first frequency f1. Switching controller 8 is configured to cause a length of a first cycle of the k-th PWM signal appearing firstly after the change time point tch to be T2−D×(k−1). Switching controller 8 is configured to cause lengths of cycles after the first cycle of the k-th PWM signal (S2 to S4) after the change time point tch to be the period T2.

The duty ratios of PWM signals S2 to S4 immediately after frequency change signal Sc is supplied are equal to a duty ratio of PWM signal S1, and the periods of PWM signals S2 to S4 may be shortened or extended. In other words, lengths of the first cycles of PWM signals S2 to S4 firstly appearing after frequency change signal Sc is supplied may be shortened or extended by shortening both the on-duty duration and off-duty duration or extending both the on-duty duration and off-duty duration.

REFERENCE MARKS IN THE DRAWINGS 1 polyphase power-supply device
2 input terminal
3 output terminal
4 DC-DC converter
5 DC-DC converter
6 DC-DC converter
7 DC-DC converter
8 switching controller
9 switching element
10 switching element
11 switching element
12 switching element
13 pulse-width control circuit
14 frequency control circuit
15 spread spectrum circuit
17 calculation circuit

The invention claimed is:

1. A polyphase power-supply device comprising: an input terminal; an output terminal; a plurality of DC-DC converters of first to N-th phases connected in parallel to one another between the input terminal and the output terminal; and a switching controller, wherein the switching controller is configured to: supply pulse width modulation (PWM) signals of the first to N-th phases performing interleave control on an operation of the plurality of DC-DC converters of the first to N-th phases, the first to N-th phases having a phase difference obtained by dividing 360° by N from one another; change a switching frequency of the PWM signals from a first frequency to a second frequency; provide a difference time D by dividing, by N, a value obtained by subtracting a period of the second frequency from a period of the first frequency; supply respective first cycles of the PWM signals of the second to N-th phases appearing firstly after changing the switching frequency at respective timings of the respective first cycles by an amount changing sequentially from the differential time D for a PWM signal of the second phase to a product of D and (N−1) for a PWM signal of the N-th phase; and supply respective second and subsequent cycles of the PWM signals of the first to the N-th phases after the switching frequency is changed so as to control the operation of the plurality of DC-DC converters from the first to N-th phases at the second frequency, rising timings of on-duty durations of the respective second and subsequent cycles from the first to N-th phases being changed sequentially by a phase difference obtained by dividing 360° by N, the respective second and subsequent cycles from the first to N-th phases having a same length.

2. The polyphase power-supply device according to claim 1, wherein the switching controller is configured to supply the respective second cycles of the PWM signals of the first to N-th phases appearing secondly after changing the switching frequency so as to control the operation of the plurality of DC-DC converters from the first to N-th phases at the second frequency, the rising timings of the on-duty durations of the respective second cycles sequentially from the first to N-th phases being changed by the phase difference obtained by dividing 360° by N, the respective second cycles having the same length.

3. The polyphase power-supply device according to claim 1, wherein the switching controller includes:
a pulse-width control circuit configured to supply the PWM signals of the first to N-th phases to switching elements of the plurality of DC-DC converters of the first to N-th phases, the PWM signals controlling turning on and off of the switching elements;
a frequency control circuit configured to control the switching frequency of the PWM signals;
a spread spectrum circuit configured to change the switching frequency;
a detection circuit configured to detect a voltage at the output terminal; and
a calculation circuit configured to perform an arithmetic operation based on information detected by the detection circuit and determine a duty ratio of the PWM signals according to information on a result of the arithmetic operation, the arithmetic operation including comparison of an output voltage, an output current, or an output electric power.

4. The polyphase power-supply device according to claim 3, wherein the switching controller is configured to:
change rinsing timings of the on-duty durations of the PWM signals of the second to N-th phases appearing firstly after the spread spectrum circuit supplies a frequency change signal, by an amount from the difference time D for the PWM signal of the second phase to the product of D and (N−1) for the PWM signal of the N-th phase; and
supply the first cycles of the PWM signals of the second phase to the N-th phase appearing firstly after the switching frequency is changed, the first cycles of the PWM signals from the second phase to the N-th being changed sequentially by an amount from the time D for the PWM signal of the second phase to the product of D and (N−1) for the PWM signal of the N-th phase.

5. The polyphase power-supply device according to claim 3, wherein
in a case that the switching frequency increases in response to a frequency change signal supplied from the spread spectrum circuit, the switching controller is configured to:
change rising timings of the on-duty durations of the PWM signals of the second phase to the N-th phase appearing firstly after the frequency change signal is supplied, the on-duty rising timing being changed sequentially by an absolute value of D for the PWM signal of the second phase to by an absolute value of the product of D and (N−1) for the PWM signal of the N-th phase; and
shorten the first cycles of the PWM signals of the second phase to the N-th phase appearing firstly after the switching frequency is changed, the first cycles being changed sequentially by the time D for eh PWM signal of the second phase to by the product of D and (N−1) for the PWM signal of the N-th phase, and in a case that the switching frequency decreases in response to the frequency change signal supplied from the spread spectrum circuit, the switching controller is configured to:
change a timing of switching from an on-duty duration to an off-duty duration of the PWM signals of the second phase to the N-th phase appearing firstly after the frequency change signal is supplied, the timing being changed sequentially by the absolute value of D for the PWM signal of the second phase to by the absolute value of the product of D and (N−1) for eh PWM signal of the N-th phase; and
extend the first cycles of the PWM signals of the second phase to the N-th phase appearing firstly after the switching frequency is changed, the first cycles sequentially by the time D for the PWM signal of the second phase being changed by the product of D and (N−1) for the PWM signal of the N-th phase.

6. The polyphase power-supply device according to claim 3, wherein the switching controller is configured to:
change a timing of switching from an on-duty duration to an off-duty duration of the PWM signals of the second phase to the N-th phase appearing firstly after the spread spectrum circuit supplies a frequency change signal, the timing being changed sequentially by the time D for the PWM signal of the second phase to by the product of D and (N−1) for the PWM signal of the N-th phase; and
change and supply the first cycles of the PWM signals of the second phase to the N-th phase appearing firstly after the switching frequency is changed, the first cycles being changed sequentially by the time D for the PWM signal of the second phase to by the product of D and (N−1) for the PWM signal of the N-th phase.

7. A polyphase power-supply device comprising:
an input terminal;
an output terminal;
first to N-th DC-DC converters connected in parallel to one another between the input terminal and the output terminal, where N is an integer equal to or greater than two; and
a switching controller configured to perform interleave control on the first to N-th DC-DC converters by supplying first to N-th pulse width modulation (PWM) signals to the first to N-th DC-DC converters, respectively, wherein
a phase of a k-th PWM signal out of the first to N-th PWM signals is delayed by a phase of 360°/N from a (k−1)-th PWM signal, where k is any integer satisfying 2≤k≤N), and
the switching controller is configured to:
change a switching frequency of the first PWM signal from a first frequency to a second frequency at a change time point when a certain cycle of the first PWM signal starts;
obtain a differential time D by dividing, by N, a period difference calculated by subtracting a period T2 of the second frequency from a period T1 of the first frequency as D=(T1−T2)/N;
cause a length of a first cycle of the k-th PWM signal appearing firstly after the change time point to be T2−D×(k−1); and cause lengths of cycles after the first cycle of the k-th PWM signal after the change time point to be the period T2.

\* \* \* \* \*